United States Patent
Muramatsu

(10) Patent No.: US 9,977,239 B2
(45) Date of Patent: May 22, 2018

(54) VEHICLE INFORMATION PRESENTATION DEVICE

(71) Applicant: TOYOTA JIDOSHA KABUSHIKI KAISHA, Toyota-shi, Aichi-ken (JP)

(72) Inventor: Yoshiyuki Muramatsu, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 14/858,591

(22) Filed: Sep. 18, 2015

(65) Prior Publication Data
US 2016/0097928 A1   Apr. 7, 2016

(30) Foreign Application Priority Data
Oct. 3, 2014 (JP) .................. 2014-205097

(51) Int. Cl.
G02B 27/01 (2006.01)
B60K 35/00 (2006.01)

(52) U.S. Cl.
CPC .......... *G02B 27/0101* (2013.01); *B60K 35/00* (2013.01); *G02B 27/0179* (2013.01); *B60K 2350/1004* (2013.01); *B60K 2350/1084* (2013.01); *B60K 2350/2052* (2013.01); *B60K 2350/965* (2013.01); *G02B 2027/014* (2013.01); *G02B 2027/0138* (2013.01); *G02B 2027/0141* (2013.01); *G02B 2027/0187* (2013.01)

(58) Field of Classification Search
None
See application file for complete search history.

(56) References Cited

U.S. PATENT DOCUMENTS

| 2002/0067366 A1* | 6/2002 | Hirao ............... B60K 35/00 345/660 |
| 2008/0238640 A1 | 10/2008 | Mori et al. |
| 2011/0128139 A1* | 6/2011 | Tauchi ............... B60K 35/00 340/439 |

(Continued)

FOREIGN PATENT DOCUMENTS

| JP | 2000-149167 A | 5/2000 |
| JP | 2003-291688 A | 10/2003 |
| JP | 2008-269586 A | 11/2008 |

(Continued)

*Primary Examiner* — Jennifer Mehmood
*Assistant Examiner* — Parul Gupta
(74) *Attorney, Agent, or Firm* — Oliff PLC

(57) ABSTRACT

A presentation controller in a control device captures an image of a driver using an onboard camera of an occupant state detection section, and acquires a state of the driver that is detected in the captured image and represents the posture of the driver, and the position of part of the body of the driver. The presentation controller then uses road-vehicle inter-communication to acquire, as an event, information from a detector of an event detection section indicating a danger in front of the vehicle, and detects a presentation direction for the event. The presentation controller then controls a device of a presentation section so as to move a marker that is assistance information along a direction from the vehicle toward the driver, as information perceivable by the occupant. The presentation controller then notifies the event to the ears of the driver.

7 Claims, 17 Drawing Sheets

(56) References Cited

U.S. PATENT DOCUMENTS

2012/0069188 A1* 3/2012 Ohno .................. B60R 1/00
                                                    348/148
2012/0242465 A1    9/2012 Murata et al.

FOREIGN PATENT DOCUMENTS

| JP | 2009-211628 A | 9/2009 |
| JP | 2011-113385 A | 6/2011 |
| JP | 2014-010800 A | 1/2014 |
| WO | 2011/071044 A1 | 6/2011 |

\* cited by examiner

FIG.6

| DEVICE \ PRESENTATION POSITION | EXTERNAL TO VEHICLE | WITHIN VEHICLE CABIN | | DRIVER | |
|---|---|---|---|---|---|
| | FRONT WINDSHIELD | INSTRUMENT PANEL | · STEERING WHEEL<br>· SEAT | ARM/SHOULDER | EARS |
| LIGHT | ○ | ○ | ○ | ○ | |
| SOUND | | ))) | ))) | ))) | ))) |
| VIBRATION | | | ∿ | ∿ | |

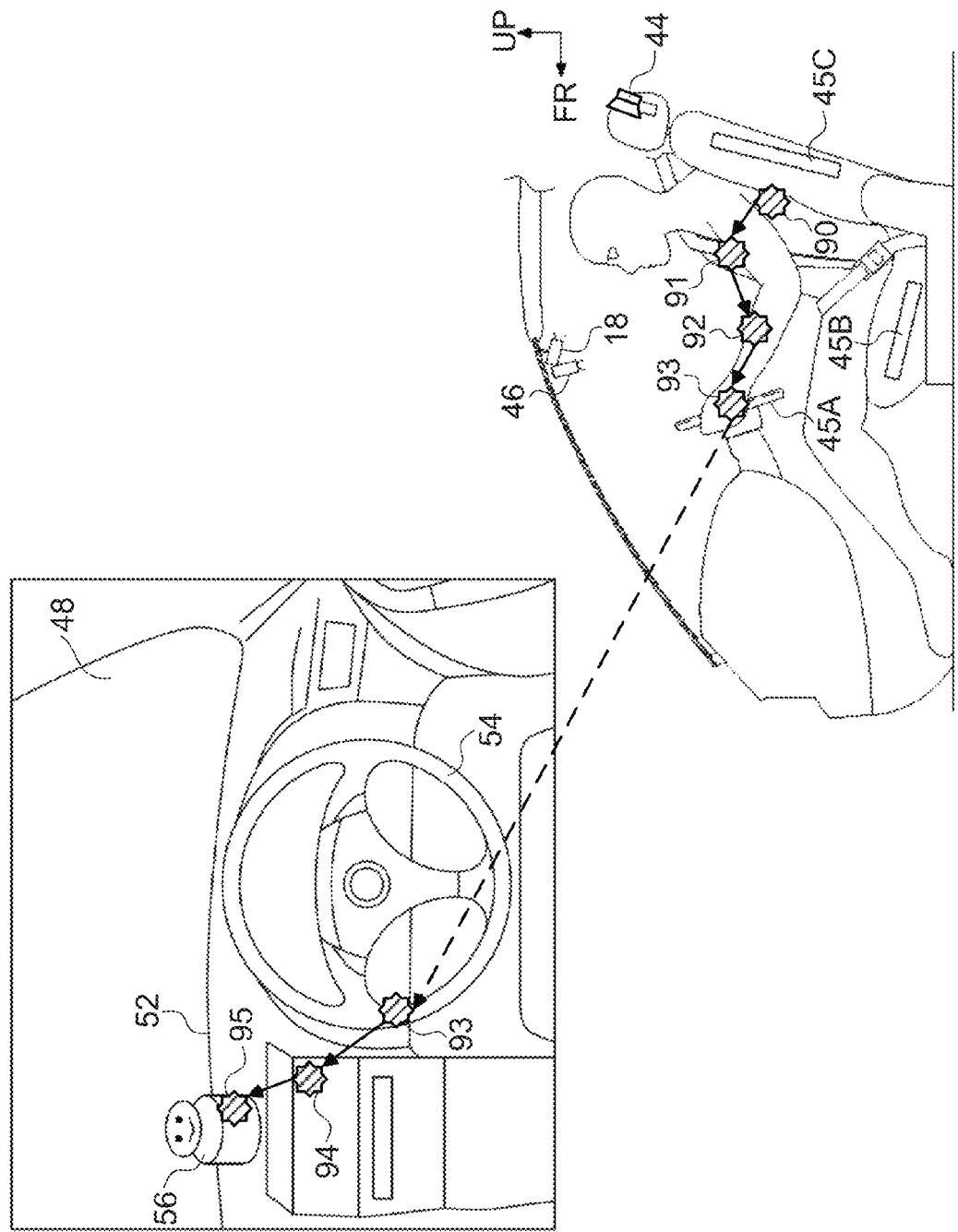

VEHICLE INFORMATION PRESENTATION DEVICE

CROSS-REFERENCE TO RELATED APPLICATION

This application is based on and claims priority under 35 USC 119 from Japanese Patent Application No. 2014-205097, filed on Oct. 3, 2014, which is incorporated by reference herein.

BACKGROUND

Technical Field

The present invention relates to a vehicle information presentation device.

Related Art

Technology is known in which pictures, graphic shapes, or the like are displayed on a display in order to assist an occupant in driving a vehicle. For example, technology is known in which a marker indicating the direction a vehicle should be progressing is superimposed on the actual scenery in front of a vehicle and displayed as a picture by a head-up display mounted to the vehicle (see, for example, Japanese Patent Application Laid-Open (JP-A) No. 2014-010800 (Patent Document 1)). In this technology, in order to effectively make the occupant aware of danger in front of the vehicle, the size of the marker is displayed so as to gradually increase with the passage of time when a danger has been detected in front of the vehicle.

However, presentation of information to assist an occupant in driving a vehicle is merely automatically displaying on a display installed at a predetermined position, and is lacking in affinity with respect to the passing of information from the vehicle to the occupant. Namely, automatic display using a display installed at a predetermined position is performed irrespective of whether the occupant constantly pays attention to the display, and is insufficient to assist in reliably making an occupant aware of information from the vehicle to the occupant that is desired to be transmitted to the occupant.

In cases in which the intention of the occupant is transmitted from the occupant to the vehicle, this is generally instructed by operation of onboard switches or by voice, using a microphone. For example, if the occupant wishes to ascertain the weather at the destination, a voice command to display the destination weather is issued, an onboard device detects the voice command, and display is performed on a display or the like. Instructions from the occupant using an input device such as an onboard switch or microphone are merely automatically instructed by the input device, and affinity with respect to the passing of information from the occupant to the vehicle is lacking. Namely, when the occupant has completed an automatic instruction using the input device, the occupant understands this to mean that the intention has been transmitted, and this is insufficient to make the occupant aware that the intention of the occupant has been transmitted to the vehicle.

SUMMARY

In consideration of the above circumstances, an object of the present invention is to provide a vehicle information presentation device capable of exchanging information between a vehicle and the vehicle occupant with a high level of affinity.

In order to achieve the above object, a vehicle information presentation device according to a first aspect of the present invention includes: a presentation section that presents information perceivable by an occupant at plural positions within a vehicle cabin along a presentation direction for presenting particular information to be exchanged between a vehicle and the occupant; a detection section that detects the presentation direction for presenting the particular information; and a control section that controls the presentation section so as to move the perceivable information in sequence to plural positions along the presentation direction detected by the detection section.

According to the first aspect, the presentation section presents information perceivable by the occupant at plural positions within a vehicle cabin along a presentation direction for presenting particular information to be exchanged between a vehicle and the occupant. The detection section detects the presentation direction for presenting the particular information. The control section controls the presentation section so as to move the perceivable information in sequence to plural positions along the presentation direction detected by the detection section. This thereby enables information perceivable by the occupant to be presented in sequence at plural positions according to the presentation direction, enabling the occupant to become aware of the particular information to be exchanged between a vehicle and the occupant, as information perceivable in a condition of going toward the vehicle or coming from the vehicle.

In a second aspect, the plural positions may be provided at at least one out of a picture display section capable of displaying a picture superimposed on actual scenery in front of the vehicle, or part of the body of the occupant. Thus by providing the plural positions at at least one out of a picture display section or part of the body of the occupant, the occupant is able to perceive the information using sight, or using the five senses of the occupant including sight.

In a third aspect, in cases in which the presentation direction is from one side at the left or right of the vehicle and from one out of the vehicle or the occupant toward the other out of the vehicle or the occupant, the control section may control the presentation section so as to sequentially move through each of the plural positions from the side of the picture display section corresponding toward the one side at the left or right of the vehicle to the side of the picture display section corresponding to the other side at the left or right of the vehicle, and so as to sequentially move through each of the plural positions on the side of part of the body of the occupant corresponding to the one side at the left or right of the vehicle.

When presenting the particular information to be exchanged between the vehicle and the occupant, sometimes the presentation direction has a start point on the left or the right. Therefore, in cases in which the presentation direction is from one side at the left or right of the vehicle and from one out of the vehicle or the occupant toward the other out of the vehicle or the occupant, by controlling the presentation section so as to sequentially move to each of the plural positions from the side corresponding to the one side to the side corresponding to the other side, the occupant can become aware of the directionality from the start point of the presentation direction.

In a fourth aspect, the detection section includes a monitoring section that monitors a position on part of the body of the occupant, and the presentation section presents the perceivable information at plural positions on a part of the body of the occupant based on a monitoring result of the monitoring section. Sometimes the posture of the occupant, or the position of the part of the body of the occupant, such as the arm, moves. The position of the part of the body of the occupant, such as the arm, can be identified by monitoring the position of the part of the body of the occupant using the monitoring section.

In a fifth aspect, the presentation section may present the perceivable information through at least one out of a light emitting section that shines light onto the occupant, a sound generation section that imparts sound to the occupant, or a vibration section that imparts vibration to the occupant.

In a sixth aspect, the light emitting section may include a picture display section capable of displaying a picture superimposed on actual scenery in front of a vehicle, and a marker display section that displays a marker of a specific color and specific shape within the vehicle cabin. In such cases, the control section may, cause a picture of the marker to be displayed as the perceivable information on the picture display section, and cause the marker to be displayed as the perceivable information using the marker display section, in sequence along the presentation direction.

In a seventh aspect, the control section may control the presentation section using a direction toward the occupant as the presentation direction in cases in which the detection section has detected the direction from the vehicle toward the occupant for presenting the particular information that the attention of the occupant needs to be drawn to. In this manner, in cases in which the direction from the vehicle toward the occupant is detected, presenting the information perceivable by the occupant in plural positions in sequence with the presentation direction as a direction toward the occupant enables the occupant to become aware of the particular information as being presented from the vehicle toward the occupant.

In an eighth aspect, the control section may control the presentation section with a direction from the occupant toward a predetermined position within the vehicle cabin as the presentation direction in cases in which the detection section has detected a direction from the occupant toward the vehicle for presenting the particular information that originates from the occupant. In this manner, when a direction from the occupant toward the vehicle is detected, presenting the information perceivable by the occupant sequentially at plural positions with a direction toward the vehicle as the presentation direction enables the occupant to become aware of the particular information as being presented from the occupant toward the vehicle.

As explained above, the present invention exhibits the advantageous effect of enabling affinity to be raised in the exchange of information between a vehicle and an occupant of a vehicle.

BRIEF DESCRIPTION OF DRAWINGS

FIG. 6 is an illustrative diagram illustrating an example of relationships between types of assistance information and presentation position.

FIG. 17 is an illustrative diagram indicating an example of assistance information according to the second exemplary embodiment.

DETAILED DESCRIPTION

Detailed explanation follows regarding exemplary embodiments of the present invention, with reference to the drawings.

First Exemplary Embodiment

Figure 1:
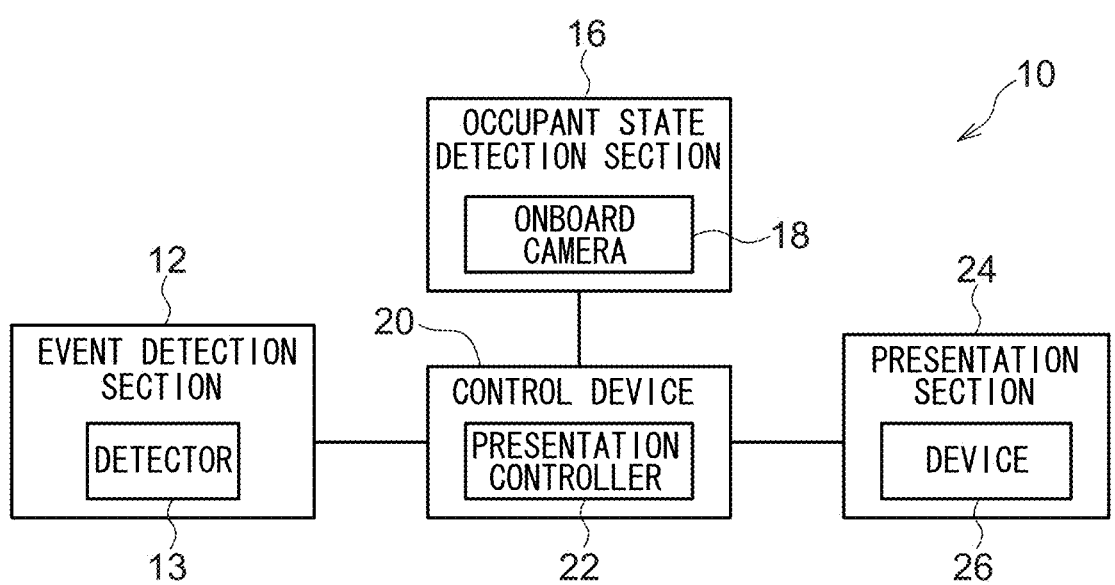
FIG. 1 is a block diagram illustrating an example of a schematic configuration of an onboard device according to a first exemplary embodiment.

FIG. 1 illustrates a schematic configuration of an onboard device 10 according to an exemplary embodiment. The onboard device 10 is an example of a vehicle information presentation device according to the present invention. The onboard device 10 is installed in a vehicle, and is a device that presents various information to an occupant (for example, a driver, referred to below as the driver).

The onboard device 10 includes an event detection section 12, an occupant state detection section 16, a control device 20, and a presentation section 24.

The event detection section 12 faces out from a vehicle toward a driver, or faces out from the driver toward the vehicle, and is a functional section for detecting events indicating the exchange of information. In the present exemplary embodiment, the event detection section 12 includes a detector 13, and explanation follows regarding a case in which the detector 13 detects an event that indicates the presentation of information from the vehicle to the driver. An example of the detector 13 is a communications device that receives a road state by road-vehicle inter-communication such as a wireless communicator using narrow band communication in dedicated short range communications (DSRC).

The occupant state detection section 16 is a functional section that detects information indicating the state of a driver. An example of information indicating the state of a driver is information indicating the posture and position of the driver, and the position of a part of the body of the driver. Examples of the part of the body include the head, ears, eyes, arms, shoulders, and legs. In the present exemplary embodiment, the occupant state detection section 16 includes an onboard camera 18, and the posture and position of the driver, and the position of part of the body of the driver are detected by the onboard camera 18.

Explanation follows in the present exemplary embodiment regarding an example in which the state of the driver is detected by the onboard camera 18, however there is no limitation to detecting the state of a driver using an image captured by the onboard camera 18. For example, the state of a driver may be detected using an infrared sensor, or may be detected by using a contact sensor provided at a position the driver touches. The event detection section 12 is an example of a detection section function in the present invention. The occupant state detection section 16 is an example of a monitoring section function in the present invention.

The control device 20 includes a presentation controller that controls presentation of information on a device 26, described below.

Figure 2:
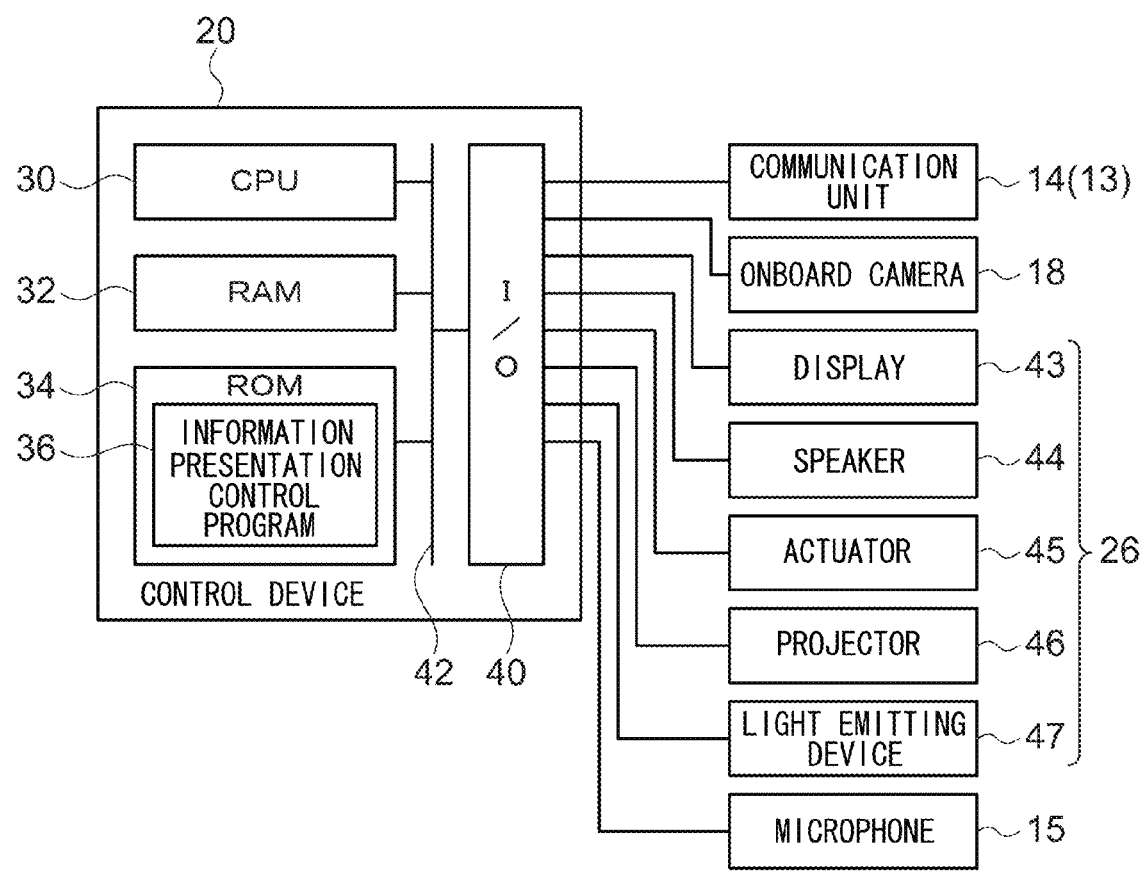
FIG. 2 is a block diagram illustrating an example of a schematic configuration of a control device.

FIG. 2 illustrates a schematic configuration of the control device 20 according to the present exemplary embodiment. As illustrated in FIG. 2, the control device 20 includes a CPU 30, RAM 32, ROM 34 that serves as a non-volatile storage section for storing an information presentation control program 36, and an input/output interface (I/O) 40 that performs communication with external devices, with each of these sections connected together through a bus 42. A communication unit 14, serving as an example of the detector 13 illustrated in FIG. 1, a microphone 15, and the onboard camera 18 are connected to the I/O 40. A display 43, a speaker 44, an actuator 45, a projector 46, and a light emitting device 47 are also connected, as the device 26 illustrated in FIG. 1, to the I/O 40. The control device 20 functions as the presentation controller 22 illustrated in FIG. 1 by reading the information presentation control program 36 from the ROM 34, expanding the information presentation control program 36 in the RAM 32, and using the CPU 30 to execute the information presentation control program 36 that was expanded in the RAM 32.

The control device 20 corresponds to an example of a control section of the present invention. The information presentation control program 36 is an example of a program of the vehicle information presentation device. The device 26, configured by the display 43, the speaker 44, the actuator 45, the projector 46, and the light emitting device 47, is an example of a presentation section of the present invention. The display 43 is an example of a light emitting section and a picture display section, and the light emitting device 47 is an example of a light emitting section. The speaker 44 is an example of a sound generator, and the actuator 45 is an example of a sound generation section. The actuator 45 is an example of a vibration section. The projector 46 is an example of a marker display section.

The presentation section 24 illustrated in FIG. 1 includes the device 26 for presenting information from the control device 20 to a driver, using pictures, sound, vibration, etc. In the present exemplary embodiment, as illustrated in FIG. 2, the device 26 includes the display 43, the speaker 44, the actuator 45, the projector 46, and the light emitting device 47.

Figure 3:
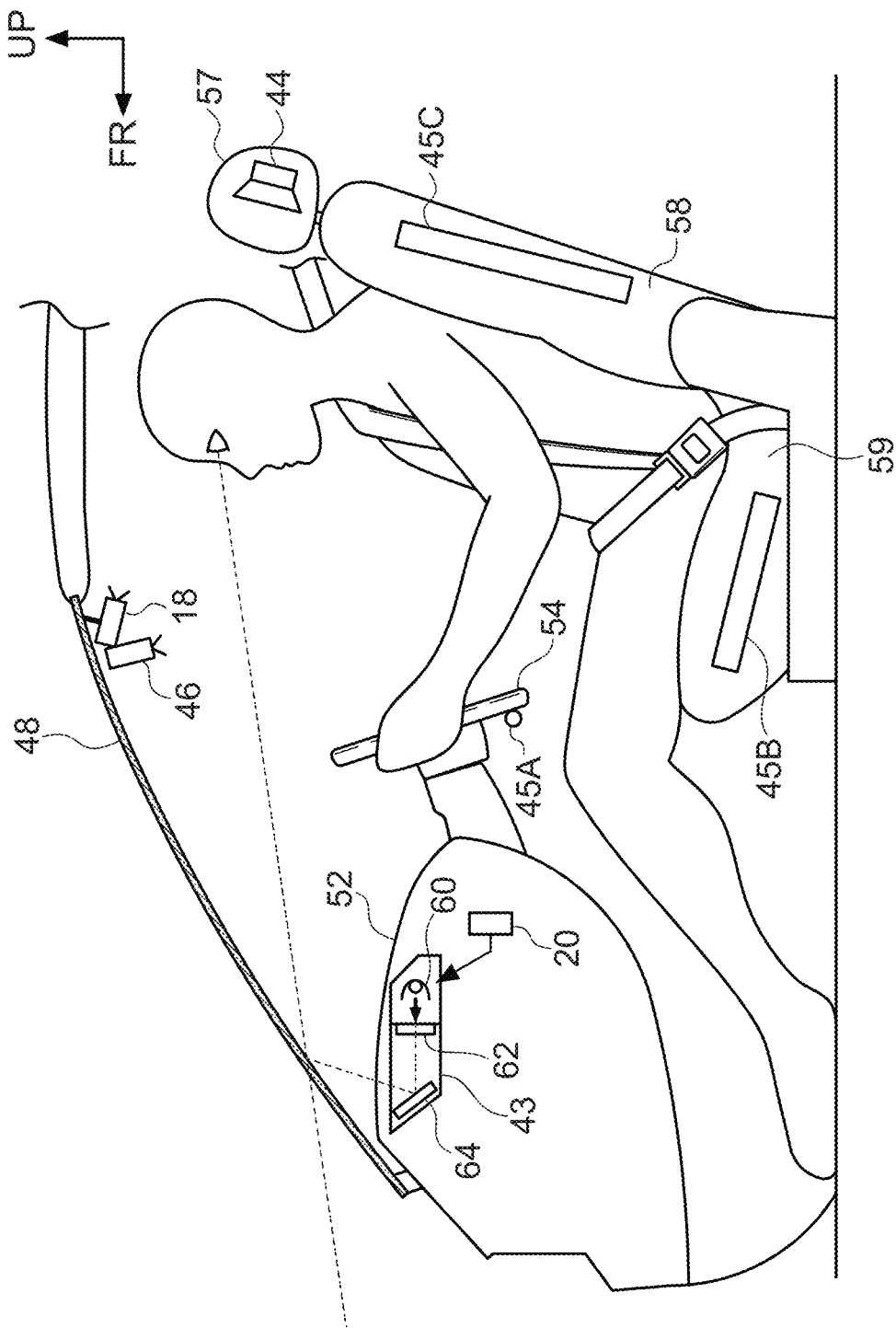
FIG. 3 is an explanatory diagram illustrating an example of a schematic configuration of a display.
Figure 4:
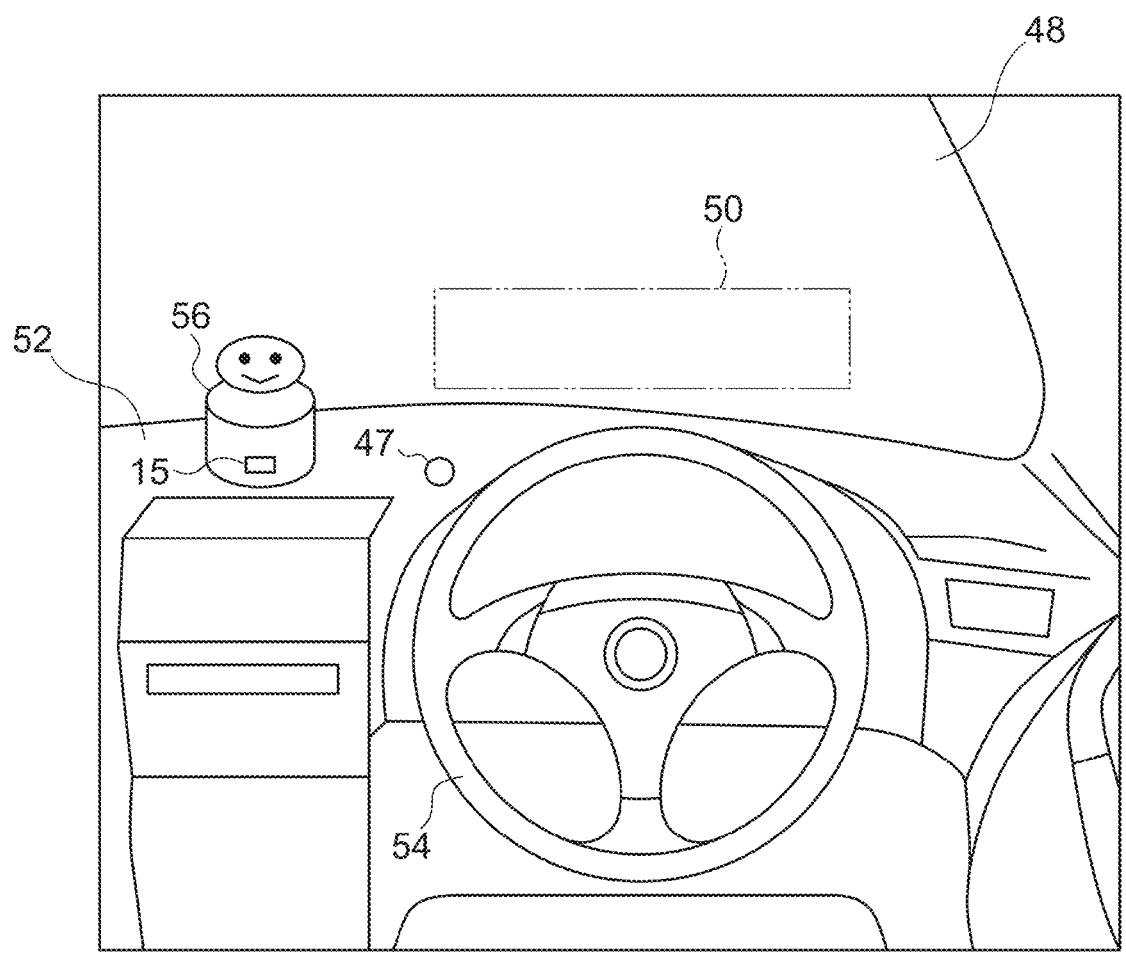
FIG. 4 is an explanatory diagram illustrating an example of a vehicle cabin inside including a field of view of a driver in front of a vehicle.

FIG. 3 illustrates an example of a layout of the device 26 illustrated in FIG. 1 including an example of a schematic configuration of the display 43. FIG. 4 illustrates an example of a vehicle cabin inside including the field of view of a driver in front of the vehicle. The arrow UP and the arrow FR illustrated in FIG. 3 indicate the vehicle up-down direction upper side and the vehicle front-rear direction front side, respectively.

As illustrated in FIG. 3, the display 43 is installed in a vehicle instrument panel 52, and includes a light source 60, a liquid crystal panel 62 through which light emitted from the light source 60 passes, and a refection mirror 64 that reflects light that has passed through the liquid crystal panel 62 toward a vehicle front windshield 48.

The display 43 is instructed by the control device 20 with a picture to be projected toward the front windshield 48, and controls driving of the liquid crystal panel 62 according to the instructed picture. Light that has passed through the liquid crystal panel 62 is accordingly reflected by the refection mirror 64, and illuminated onto the front windshield 48, and the picture instructed by the control device 20 is thereby projected onto the front windshield 48, within a display region 50. Namely, as the picture, the display 43 projects an image representing a marker, described in detail below, onto the front windshield 48, within the display region 50 so as to be contained in the field of view of the driver while driving. FIG. 4 illustrates an example in which the display 43 projects a picture onto a part region at the vehicle upper side of a steering wheel 54 so as to be contained in the display region 50. The display region 50 is not limited to being a part region of the front windshield 48, and may be the entire region of the front windshield 48.

The onboard camera 18 and the projector 46 are attached to an upper side portion of the front windshield 48 within a vehicle cabin. As described above, the onboard camera 18 detects the posture and position of the driver, and the position of part of the body of the driver. The projector 46 projects the image representing the marker within the vehicle cabin. In the present exemplary embodiment, as described in detail later, the projector 46 projects the image representing the marker onto part of the body of the driver (for example onto the arm and shoulder). The light emitting device 47 such as an LED lamp is attached to the vehicle instrument panel 52 (see FIG. 4). The light emitting device 47 is not essential, and provision thereof may be omitted. There is no limit to the display region 50 of the picture produced by the display 43 being on the front windshield 48 illustrated in FIG. 4, as long as it is a region contained in the field of view of the driver. For example, the display region 50 may be set on the vehicle instrument panel 52. The display 43 is also not limited to the configuration illustrated in FIG. 3, and may employ another known configuration for displaying a picture.

The speaker 44 is installed within a headrest 57 of the vehicle. The speaker 44 presents audio information to the driver, and is capable of configuring a sound field in the space from the front of the vehicle to the ears of the driver. Namely, the speaker 44 is capable of presenting audio information to the driver through the sound field configured within the space. The speaker 44 is not limited to being provided in the headrest 57 illustrated in FIG. 3, as long as the speaker 44 is capable of presenting audio information to the driver. For example, the speaker 44 may be installed on the vehicle instrument panel 52. The configuration of the speaker 44 is also not limited to such a configuration, and may employ another known configuration.

An actuator 45A that is a steering wheel vibration element may be attached to the steering wheel 54 of the vehicle. An actuator 45B that is a seating face vibration element is attached at the inside of a seating face section of a seat, and an actuator 45C that is a seating face vibration element is attached inside a back face section of the seat. These actuators 45A, 45B, 45C that are vibration elements each present information to the driver by vibrating. The actuators 45A, 45B, 45C are not limited to being installed at the positions illustrated in FIG. 3, as long as they are capable of presenting information to the driver by vibrating.

As illustrated in FIG. 4, a mascot 56 is attached to the top of the vehicle instrument panel 52. The mascot 56 serves as a vehicle agent (reception target) that acts as a locus with respect to information exchange between the vehicle and the driver, and includes the microphone 15. The microphone 15 is not limited to being included in the mascot 56 as long as the microphone 15 is capable of acquiring audio information from the driver.

Figure 5:
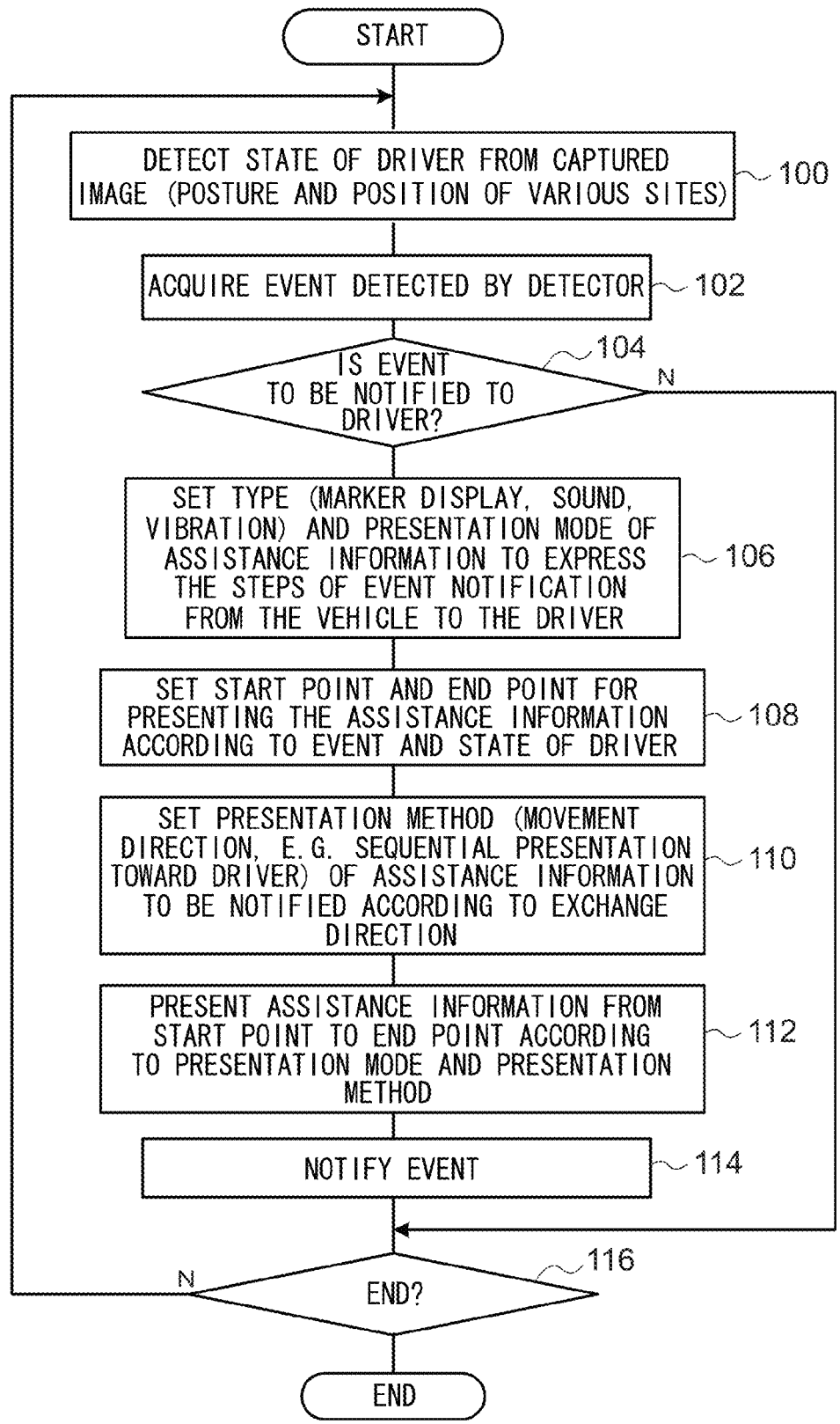
FIG. 5 is a flowchart illustrating an example of a flow of processing executed by a control device.

Explanation next follows regarding operation of the present exemplary embodiment with respect to information presentation control processing executed in the presentation controller 22 (in the control device 20) of a vehicle mounted with the onboard device 10 while, for example, the ignition switch of the vehicle installed with the onboard device 10 is switched ON, with reference to the flowchart illustrated in FIG. 5. Explanation follows in the present exemplary embodiment of a case in which, in order to make the driver aware of a danger in front of the vehicle, information is presented to the driver based on the content of an event when information indicating a dangerous state in front of the vehicle has been received as the event by road-vehicle inter-communication.

At step 100 of the information presentation control processing illustrated in FIG. 5, the presentation controller 22 of the control device 20 acquires an image of the vehicle driver (occupant capturing image) from the onboard camera 18, and detects the state of the driver from the acquired occupant capturing image. The driver state detected is the posture of the driver and the position of part of the body of the driver (of each part: both arms, both shoulders, and both ears). Then at step 102, the presentation controller 22 acquires information representing an event from outside of the vehicle detected by the communication unit 14 serving as the detector 13. In the presentation controller 22, the communication unit 14 receives information from a roadside communication unit 72 indicating a danger in front of the vehicle by road-vehicle inter-communication, and the information indicating a danger in front of the vehicle is acquired as an event. For example, information indicating a prediction that a bicycle 70 will emerge abruptly from an alley in front of the vehicle (see FIG. 7) is received from the roadside communication unit 72 as information indicating a dangerous state in front of the vehicle, and acquired as an event.

At step 104, the presentation controller 22 then determines whether or not the information presentation direction is from the vehicle toward the driver by determining whether or not the event is one to be notified to the driver. Determination at step 104 may be determination by discriminating the content of the event or by the detector 13 that acquired the event. In the present exemplary embodiment, discrimination is made that there is information to be presented to the driver due to it being the communication unit 14 that receives the information from the roadside communication unit 72, and determination is made that the information presentation direction is from the vehicle toward the driver. The determination processing of step 104 corresponds to the presentation direction detection function in the detection section of the present invention.

In cases in which negative determination is made at step 104, processing proceeds to step 116, and the presentation controller 22 determines whether or not driving of the vehicle has stopped based on, for example, whether or not the vehicle ignition switch has been switched OFF. Processing returns to step 100 and the processing is repeated in cases in which negative determination is made at step 116, and the information presentation control processing illustrated in FIG. 5 is ended in cases in which affirmative determination is made.

In cases in which affirmative determination is made at step 104, at step 106, the presentation controller 22 sets the type of assistance information as information perceivable by the occupant and sets the presentation mode. For cases in which information is to be presented in the direction of from the vehicle toward the driver, the assistance information set at step 106 is information to express the steps up to presenting (notifying) the event content from the vehicle to the driver. More specifically, at least one type is set for the assistance information from out of light, sound, or vibration. According to the set type, the shape and color of light to be presented, the loudness, tone and, sound content of sound to be presented, or the strength and frequency of vibration to be presented, is set as the presentation mode for the assistance information. For example, in cases in which event content to be notified is information indicating a danger in front of the vehicle, a shape and color of light is determined so as to cause a driver to feel anxious (for example a figure of multiple red or purple spikes) as the presentation mode for assistance information to be provided to the driver.

Then at step 108, based on the event content to be presented to the driver and the driver state, the presentation controller 22 sets positions of a start point and an end point for presenting the assistance information along an information presentation direction from the vehicle toward the driver. First, when presenting the assistance information, there is a target of presentation to the driver to indicate the event content detected by the communication unit 14. In the present exemplary embodiment, the prediction of the bicycle 70 suddenly emerging in front of the vehicle is the event content of the target for presentation to the driver. The presentation controller 22 determines the position of the bicycle 70 that is the presentation target as a start point. The event content to be presented to the driver is presented at a position that enables the driver to become aware. In the present exemplary embodiment, since the event content is to be notified at the ears of the driver, the presentation controller 22 determines the driver's ears as the end point.

At step 108, the presentation controller 22 is able to use the positions between the start position and the end position of the presentation of the assistance information to set plural positions for presenting the assistance information so as to include part of the body of the driver, for example each position of both arms and both shoulders, or each position of the arm and shoulder on the left or right.

At the next step 110, the presentation controller 22 sets the presentation method for presenting the assistance information along the information presentation direction from the vehicle toward the driver. The presentation method of the assistance information indicates the pattern in which the assistance information is to be moved along the presentation direction according to the steps up to presentation (notification) of the event from the vehicle toward the driver. For example, for presentation of information using light, there is a method in which a marker is moved along the presentation direction or the like, and for presentation of information using sound, there is a method in which a sound field is moved along the presentation direction. For presentation of information using vibration, there is a method in which the location of vibration is moved along the presentation direction.

At the next step 112, the presentation controller 22 presents the assistance information using the type and presentation mode set at step 106, from the start point to the end point set at step 108, according to the presentation method (pattern of movement) set at step 110. At the next step 114, the event is notified to the driver, and processing proceeds to step 116.

Figure 7:
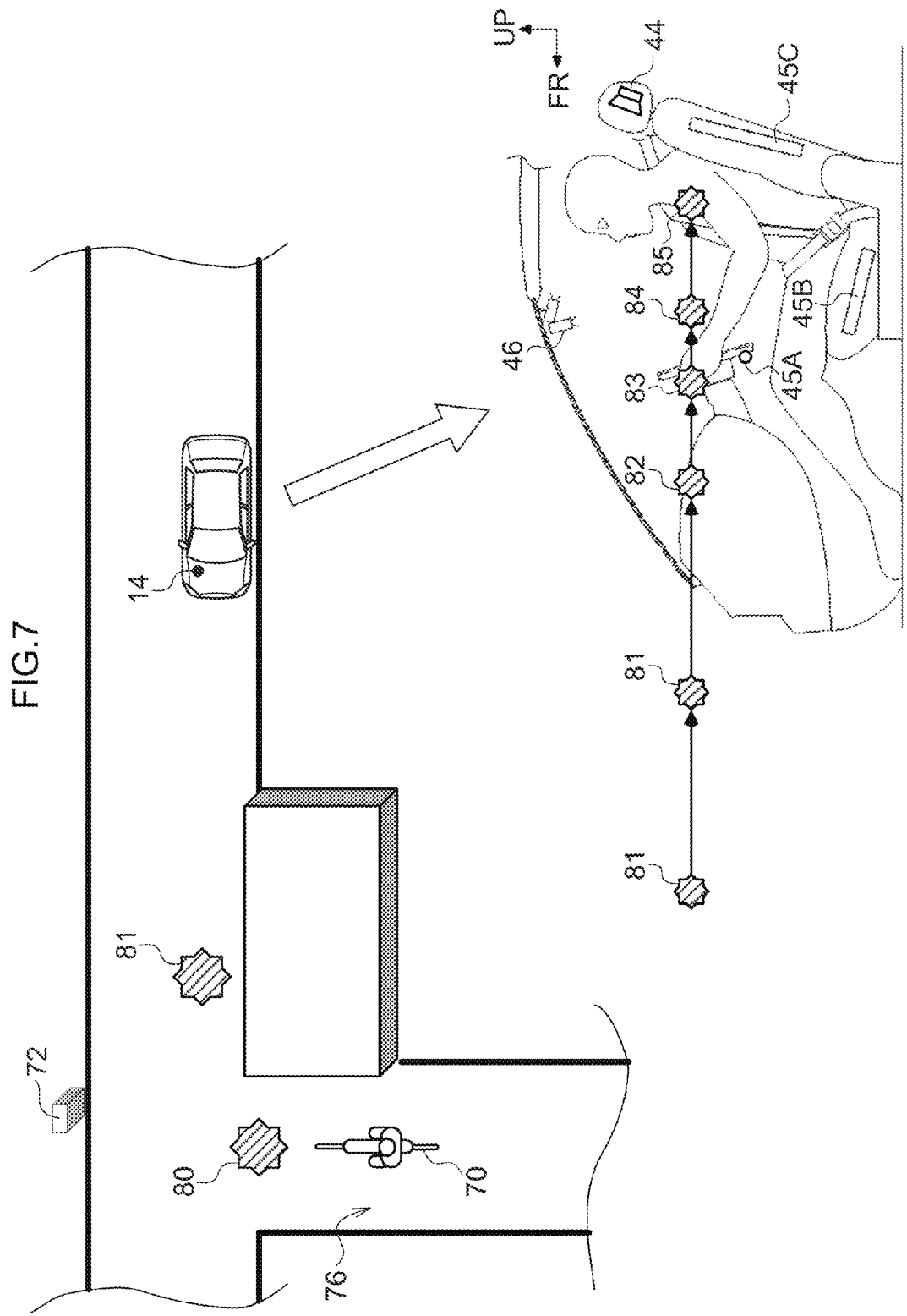
FIG. 7 is an illustrative diagram illustrating an example of a relationship between a situation indicated by an event and assistance information presentation.
Figure 8:
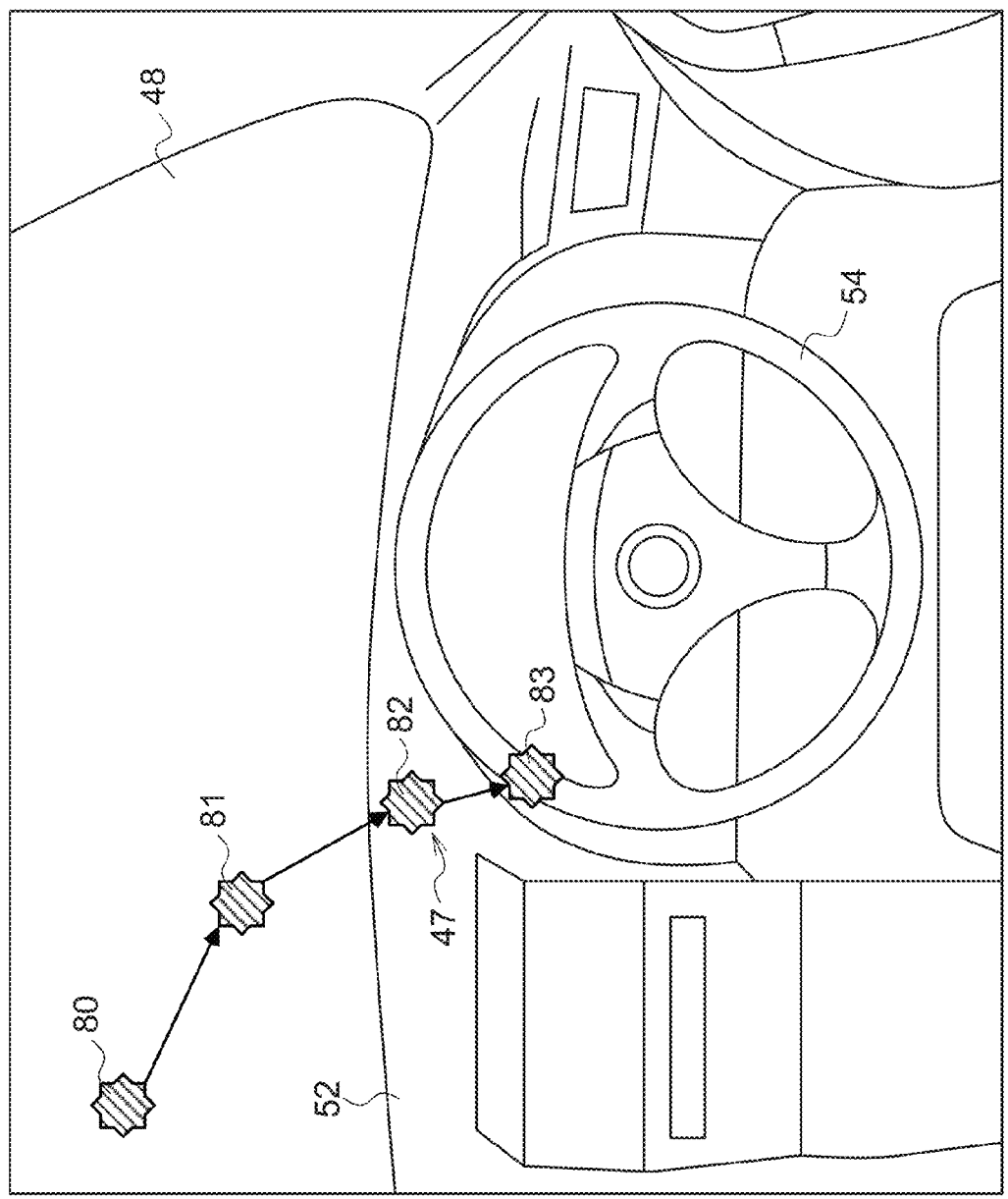
FIG. 8 is an explanatory diagram of an example of movement of assistance information.
Figure 9:
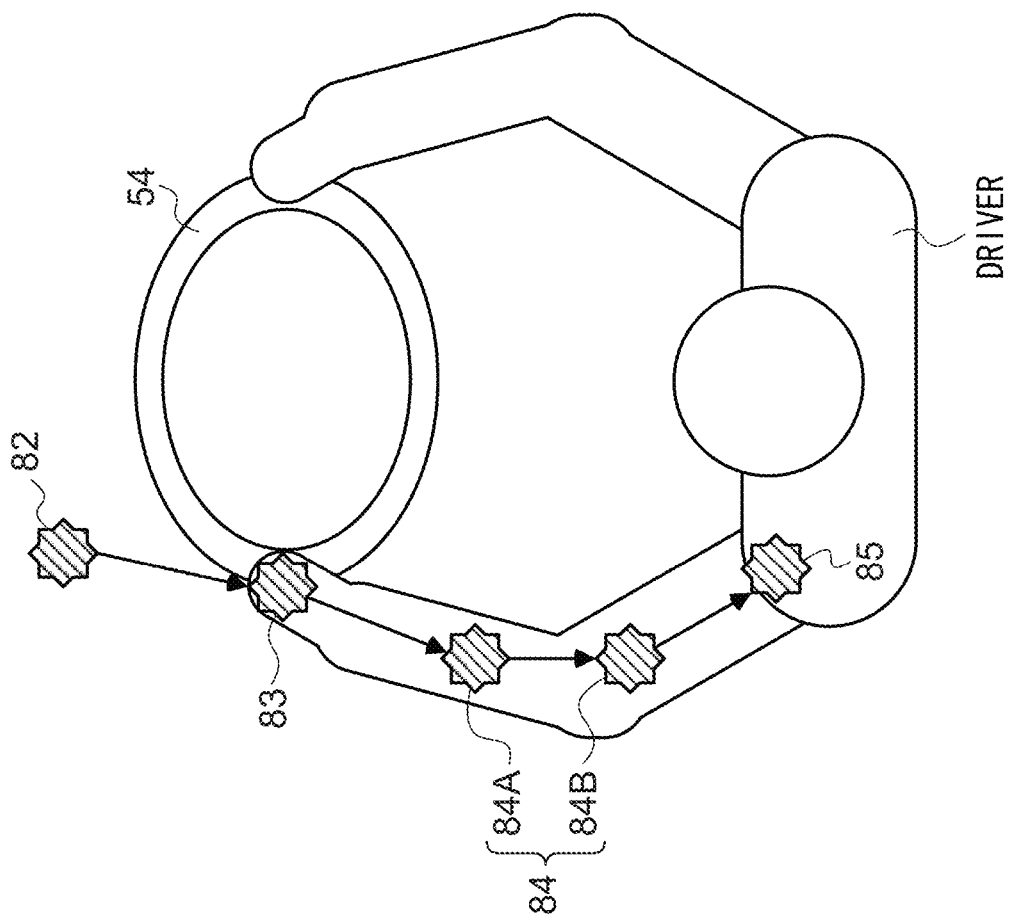
FIG. 9 is an illustrative diagram illustrating an example of movement of assistance information presented on parts of the body of an occupant.

FIG. 6 illustrates an example of relationships between types of assistance information presented and presentation position when information presentation control processing is executed. FIG. 7 is an illustrative diagram to explain an example of a relationship between a situation indicated by an event and assistance information presentation. FIG. 8 is an illustrative diagram to explain an example of movement of assistance information presented in front of a vehicle. FIG. 9 is an illustrative diagram to explain an example of movement of assistance information presented to the arm region and shoulder region, which are parts of the body of the driver. FIG. 9 illustrates an example of a case in which the assistance information is presented to regions on the left side of the driver.

For example, when an event for presentation from the vehicle toward the driver has occurred, as illustrated in FIG. 6, the assistance information is presented to the driver by light, sound, and vibration. More specifically, as illustrated in FIG. 7, as the event, information indicating a situation in which the bicycle 70 is emerging suddenly in front of the vehicle from an alley 76 in the blind spot of the driver is transmitted from the roadside communication unit 72 as, for example, information indicating a danger in front of the vehicle. The communication unit 14 receives the information indicating a danger in front of the vehicle, and presents assistance information to the driver in the direction from the vehicle toward the driver, for example sequentially along the arm and shoulder, and also notifies the event content (information indicating a danger in front of the vehicle) at the ears of the driver.

In presentation of the assistance information using light, first a marker 80 is displayed on the front windshield 48, with a portion corresponding to a position near to the entrance to the alley 76 from which the unseen bicycle 70 will appear (for example a position at the left side of the display region 50) employed as a start point of the assistance information. Then, in sequence, a marker 81 is displayed at the position where the vehicle is predicted to arrive (for example the left side of the display region 50). Due to the presentation controller 22 displaying the markers 80, 81 at portions inside the field of view of the driver that correspond to three dimensional positions of the bicycle 70, the driver can become intuitively aware of the position of the target object. Assistance information is then displayed by light within vehicle cabin at a position nearer to the driver than the front windshield 48.

Namely, the light emitting device 47 provided in the instrument panel 52 displays a marker 82 as assistance information using light. Moreover, the projector 46 projects a marker 83 in the vicinity of the steering wheel 54 within the vehicle cabin, a marker 84 in the vicinity of the arm region of the driver, and a marker 85 in the vicinity of the shoulder region of the driver, as assistance information using light. Then information of "Pay attention ahead", "Pay attention to the left", or the like is notified as event content to the driver by the speaker 44.

Accompanying the presentation of assistance information using light, information such as "Pay attention" is presented, as assistance information using sound, from in front of the vehicle that is the start point of the assistance information toward the ears of the driver that are the end point of the assistance information, such that the sound field gradually gets nearer. Moreover, as assistance information using vibration, the actuators 45A, 45B, 45C, which are vibration elements, are vibrated in sequence from the start point toward the end point of the assistance information, so that the vibration gradually gets nearer.

In the present exemplary embodiment, information regarding a situation in which the bicycle 70 is emerging suddenly in front of the vehicle from an alley on the left side in front of the vehicle (see FIG. 7) is received from the roadside communication unit 72. Namely, the information indicating a danger in front of the vehicle is weighted to draw the attention of the driver to the left side. Thus assistance information using light is the projection of a marker to the part of the body of the driver that is on the side weighted to draw attention. Namely, as illustrated in FIG. 9, the marker 83 is projected on the left side of the driver in the vicinity of the steering wheel 54, and then markers 84A, 84B are projected in sequence in the vicinity of the left arm region of the driver, then the marker 85 is projected in the vicinity of the left shoulder region of the driver. By becoming aware of the markers projected to the left side region of the driver, this thereby enables the driver to become aware of a weighting drawing attention to the left side region.

Thus based on the information indicating a danger in front of the vehicle acquired as the event, the side imparted with weighting to draw attention, namely part(s) on the left or right or both sides, can be determined, as part of the body of the driver, for marker presentation.

As explained above, in cases in the present exemplary in which the information indicating a danger in front of the vehicle is to be presented, after the markers 80 to 85 have been displayed in sequence from in front of the vehicle toward the driver, information such as "Pay attention ahead" is notified to the driver. This assistance information enables a representation to be made of a state (steps) up to presentation (notification) of information (event content), as if the information gradually approaches the driver from the vehicle, enabling affinity to be built between the vehicle and the driver. This enables an intention of the vehicle side to notify event content from the vehicle to the driver to be presented so that the driver can become aware by using moving markers, enabling, for example, promotion of behavior so that the driver turns an ear toward information such as information to draw attention.

Moreover, due to the assistance information being projection of the markers 84, 85 in sequence onto part of the body of the driver, for example in the vicinity of the arm region of the driver and then in the vicinity of the shoulder region of the driver, the driver is able to directly confirm the intention from the vehicle side.

The assistance information is not necessarily only information presented by light, and may also be presented by sound or vibration, for example by acting on the senses of vision, hearing, and touch from the five senses of the driver, so as to make the driver more aware of the assistance information.

Explanation has been given in the present exemplary embodiment of processing implemented by executing the program indicated by the flow of processing illustrated in FIG. 5, however, processing of the program may be implemented by hardware.

Explanation has been given in the present exemplary embodiment regarding a degree of danger in front of the vehicle, however, information may be presented according to the degree of danger behind the vehicle. For example, application may be made to an onboard device 10 that raises a warning according to a state detected behind a vehicle by a rear monitoring system that monitors behind the vehicle.

First Modified Example

Explanation next follows regarding a first modified example of the onboard device 10 according to the present exemplary embodiment. Explanation has been given in the above present exemplary embodiment of a case in which information indicating a dangerous state in front of the vehicle received by the communication unit 14 is acquired as an event. The first modified example is application of the present invention to a case in which recommendation information is acquired as an event from a shop located in the road vicinity. Similar configuration to that of the above exemplary embodiment is allocated the same reference numerals, and explanation thereof is omitted.

In the first modified example, a predetermined marker 80S is displayed in a predetermined position on a front windshield 48 during normal travel of a vehicle. Namely, for example, at step 100, the presentation controller 22 controls the display 43 so as to display the marker 80S.

Figure 10:
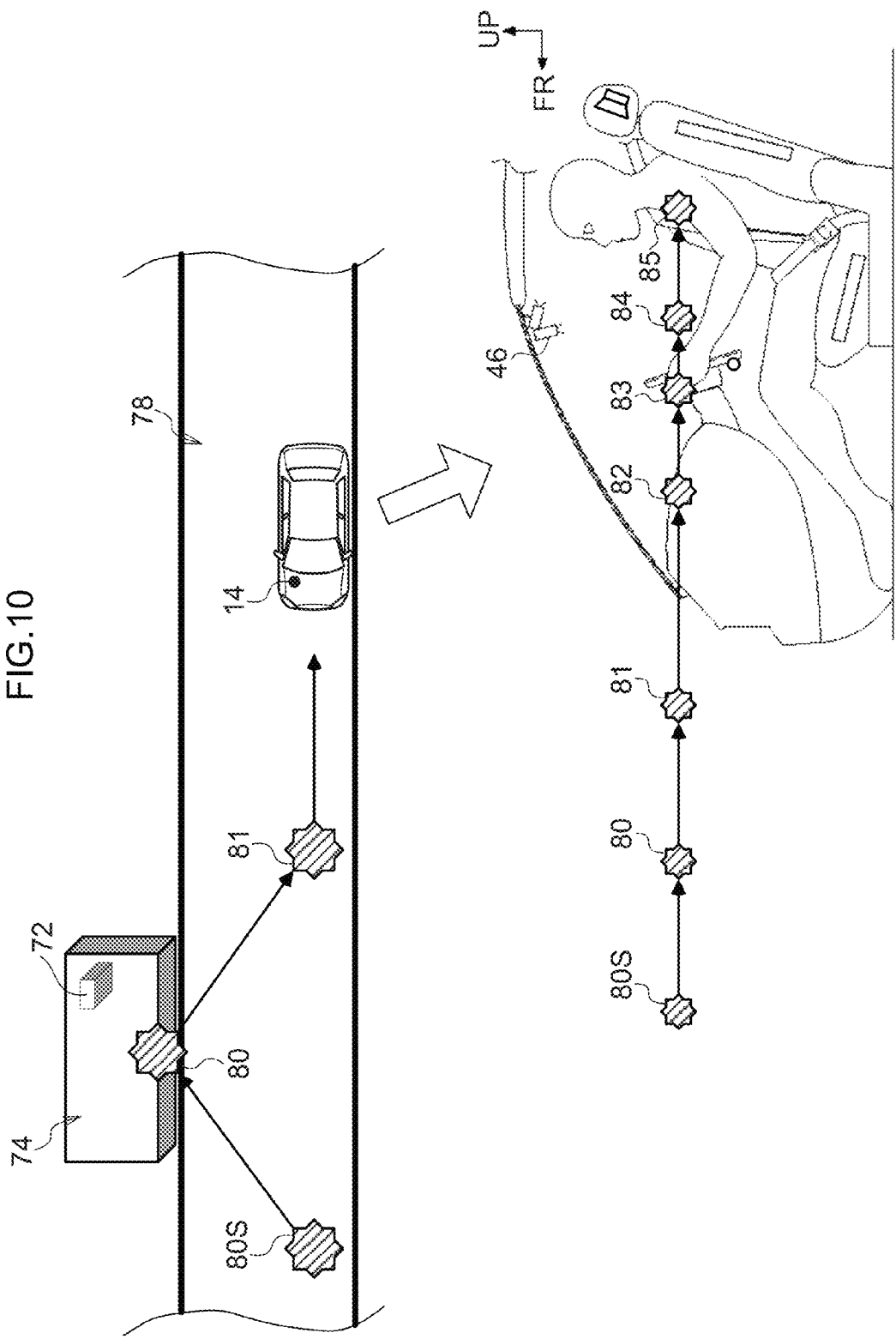
FIG. 10 is an illustrative diagram illustrating an example of a relationship between a situation indicated by an event and assistance information, according to a first modified example.
Figure 11:
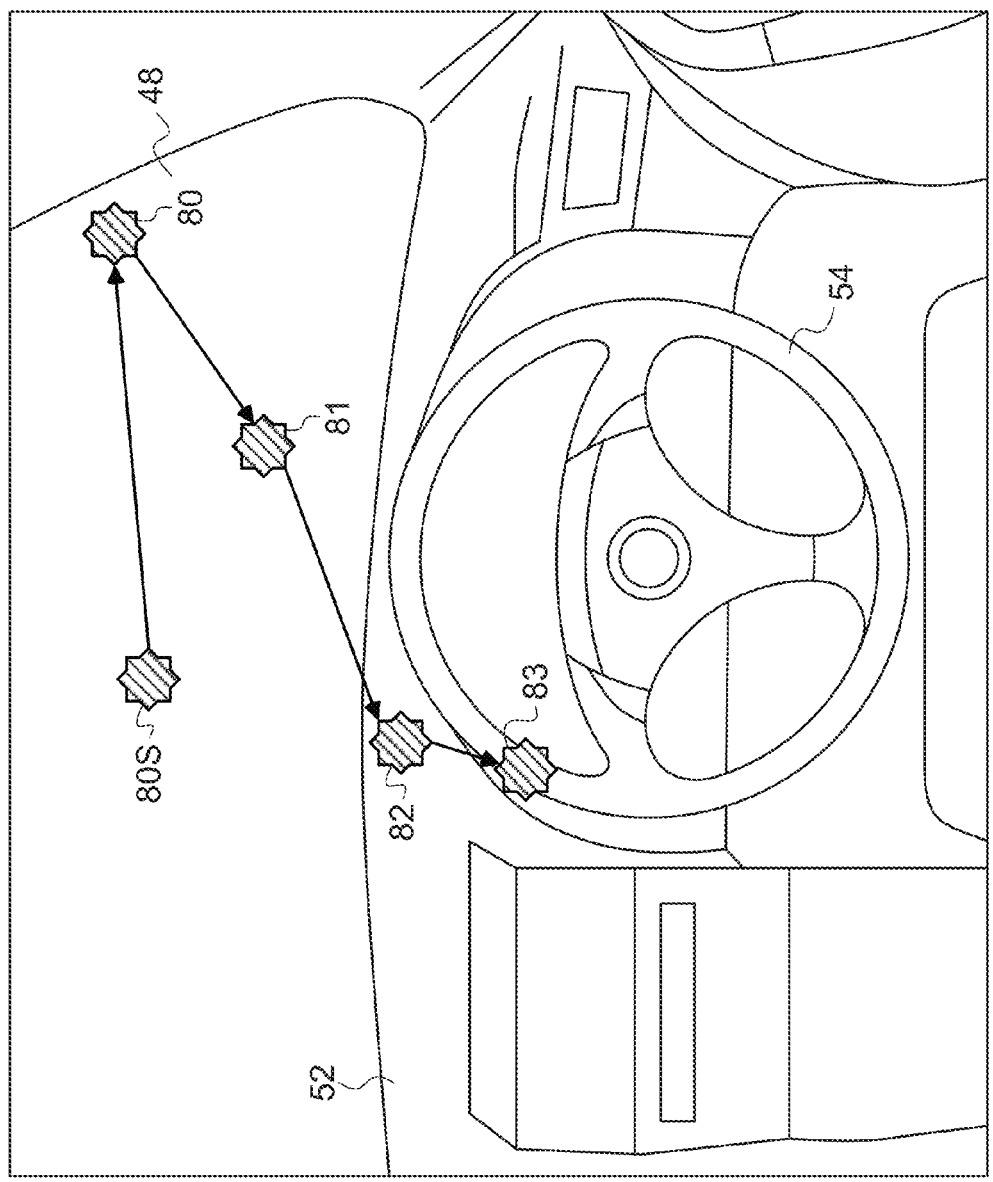
FIG. 11 is an illustrative diagram illustrating an example of movement of assistance information presented in front of a vehicle.

FIG. 10 is an illustrative diagram to explain an example of a relationship between a condition indicated by an event and assistance information to be presented, according to the first modified example. FIG. 11 is an illustrative diagram to explain an example of movement of assistance information presented in front of a vehicle. FIG. 10 illustrates a case in which a roadside communication unit 72 is provided to a shop 74 in the vicinity of a road 78 and in front of a vehicle.

First, recommendation information from the shop 74 is transmitted from the roadside communication unit 72 of the shop 74 as an event. The presentation controller 22 receives the recommendation information from the shop 74 using the communication unit 14 (the processing at step 102 of FIG. 5), presents assistance information to the driver (steps 106 to 112), and also notifies the driver of the content of the event (the recommendation information from the shop 74) (step 114).

As illustrated in FIG. 10 and FIG. 11, the predetermined marker 80S is displayed at a predetermined position during normal travel of a vehicle. In presentation of assistance information using light, display on the front windshield 48 transitions in sequence to display of the normal travel marker 80S, to a marker 80 with a portion corresponding to a position in the vicinity of the shop 74 as a start point of the assistance information, and next to a marker 81. A marker 82 is then displayed using the light emitting device 47, then sequential projection is performed using a projector 46 of a marker 83, a marker 84 in the vicinity of an arm region of the driver, and a marker 85 in the vicinity of a shoulder region of a driver. The recommendation information from the shop 74 is then notified as content of an event to the driver by the speaker 44.

In such cases, the presentation mode of the assistance information is determined by predetermined colors and shapes of the markers 80 to 85, serving as the assistance information, in order to evoke a sense of interest in the driver (processing of step 106 illustrated in FIG. 5). This thereby enables the driver to become aware in advance that the content of the presented event (the recommendation information from the shop 74) is interesting information. The recommendation information from the shop 74 may be presented by displaying a picture on the display 43. The assistance information may be presented as information using sound or vibration in order to make the driver further aware of the interesting nature.

Thus in the first modified example, transition is made from the normal travel marker 80S to the marker 80 in the vicinity of the shop 74, enabling confirmation of the presence of the shop 74 to be promoted. Thus the target for confirmation of the driver can be guided to the shop 74 (a target object) that is the originator of the event, enabling affinity to be built between the vehicle and the driver. This thereby enables a driver to confirm the shop 74 that notifies the driver of the event content (recommendation information) from the shop 74.

Although explanation has been given above of a case in which recommendation information transmitted from a roadside communication unit 72 of the shop 74 is acquired as an event, there is no limitation thereto. For example, a driving assistance device such as a navigation system may be installed to a vehicle, and may detect the position of the vehicle and interrogate the shop 74 positioned in the vicinity of the vehicle for recommendation information. The shop 74 and recommendation information of the shop 74 may also be recorded as a database in a navigation system or the like, and the position of the vehicle detected, and the recommendation information of the shop 74 positioned in the vicinity of the vehicle acquired as an event. In such cases the communication unit 14 may interrogate an external database, and acquire the recommendation information of the shop 74 positioned in the vicinity of the vehicle as an event.

Second Modified Example

Explanation next follows regarding a second modified example of the onboard device 10 according to the present exemplary embodiment. Explanation has been given in the first modified example of a case in which the recommendation information is acquired as an event from the shop 74 positioned in the road vicinity. In the second modified example, the present invention is applied to a case in which information related to tourist spots such as famous historic spots in the vicinity of the vehicle, or related to places that conform to the tastes of the driver, is acquired as an event. The same configuration to that of the above exemplary embodiment and modified example is allocated with the same reference numerals, and explanation thereof is omitted.

A difference between the first modified example and the second modified example is that instead of acquiring the recommendation information from the shop 74 of the first modified example, information related to famous historic spots is acquired in the second modified example. More specifically, in the second modified example, the presentation controller 22 acquires, as an event, information related to famous historic spots in the vicinity of the position of the vehicle from a database of famous historic spots pre-stored in a navigation system or the like (processing of step 102 illustrated in FIG. 5). The communication unit 14 may also interrogate an external database, and may acquire information related to famous historic spots in the vicinity of the position of the vehicle as an event. The presentation controller 22 presents the driver with the assistance information (steps 106 to 112), and notifies the driver with the content of an event (the information related to famous historic spots) (step 114).

Thus the second modified example is able to promote awareness in the driver of information related to famous historic spots in the vicinity of the position of the vehicle during travel of the vehicle itself.

Third Modified Example

Explanation next follows regarding a third modified example of the onboard device 10 according to the present exemplary embodiment. Explanation has been given above of cases in which the recommendation information is acquired as an event from the shop 74 in the first modified example, and the information related to tourist spots such as famous historic spots in the vicinity of the vehicle is acquired as an event in the second modified example. In the third modified example, the present invention is applied to cases in which information related to weather in the vicinity of the vehicle is acquired as an event. The same configuration to that of the above exemplary embodiment and modified examples is allocated with the same reference numerals, and explanation thereof is omitted.

The third modified example differs from the first modified example and the second modified example in that instead of target objects such as shops and tourist spots being acquired as information in the first modified example and the second modified example, in the third exemplary embodiment information related to weather in the vicinity of the vehicle or places during a journey is acquired.

Figure 12:
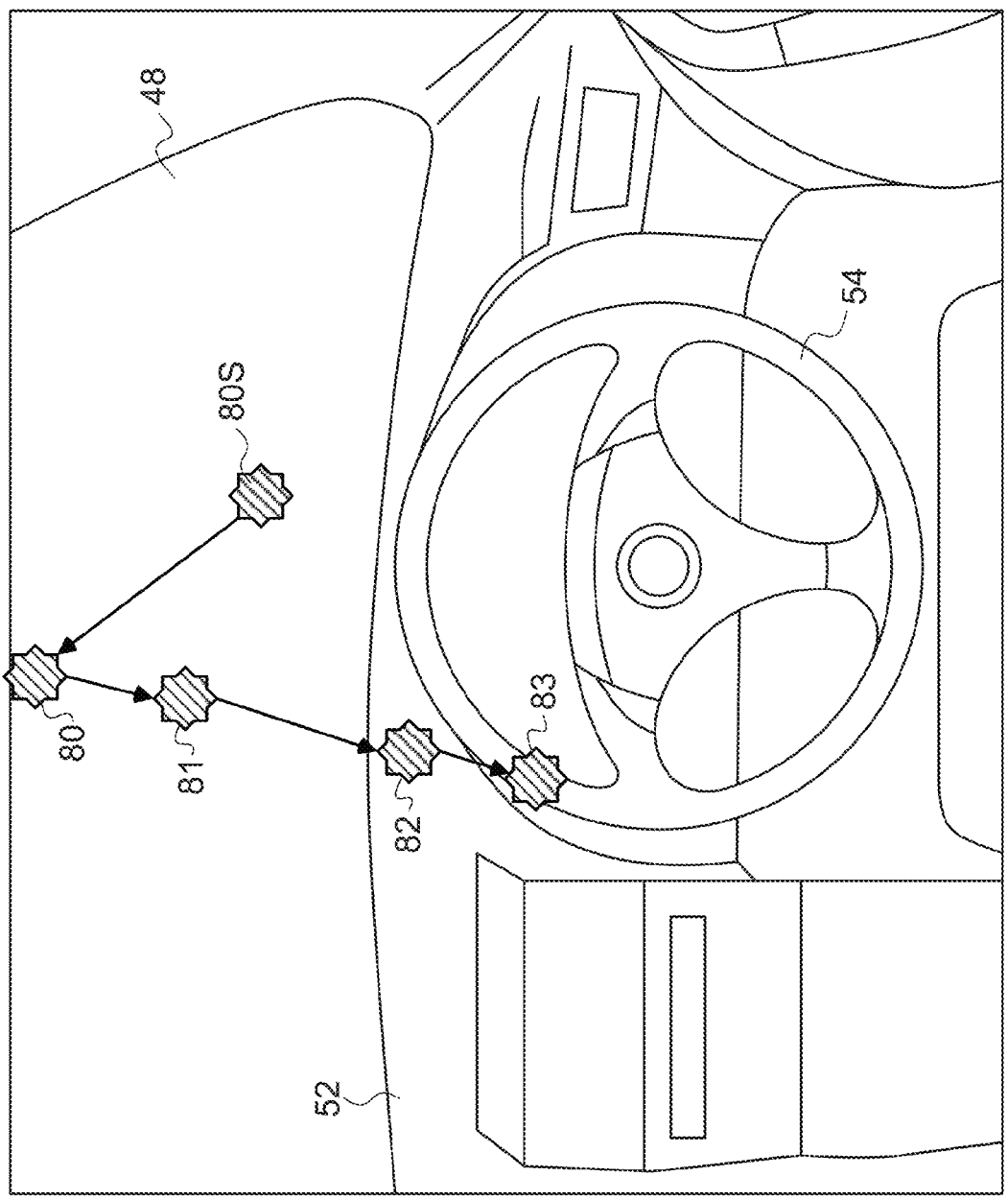
FIG. 12 is an illustrative diagram illustrating an example of movement of assistance information presented in front of a vehicle, according to a third modified example.

FIG. 12 is an illustrative diagram to explain an example of movement of assistance information presented in front of a vehicle, according to the third modified example.

The presentation controller 22 is installed in a vehicle equipped with a driving assistance device, such as a navigation system, and first detects the position of the vehicle and interrogates externally for information related to weather in the vicinity of the vehicle. Information of the interrogation result is acquired as an event (processing of step 102 illustrated in FIG. 5). Namely, the presentation controller 22 uses a communication unit 14 to receive information related to weather in the vicinity of the vehicle and presents the driver with assistance information (steps 106 to 112), and notifies the driver of the content of an event (the information related to weather in the vicinity of the vehicle) (step 114).

As illustrated in FIG. 12, in order to make the driver aware of the weather related information from the display position of the marker 80S determined for normal vehicle travel, a marker 80 is moved to an upper portion of the vehicle (for example to the uppermost position on the front windshield 48) as a start point of the assistance information, and displayed. Next, a marker 81 is moved and displayed, a marker 82 is displayed by the light emitting device 47, and a marker 83, a marker 84 in the vicinity of an arm region of the driver, and a marker 85 in the vicinity of a shoulder region of a driver are projected in sequence by the projector 46. Then the information related to the weather in the vicinity of the vehicle is notified to the driver by the speaker 44 as the content of an event.

The third modified example is thereby able to present the driver with information related to the weather in the vicinity of the vehicle during vehicle travel.

Fourth Modified Example

Explanation next follows regarding a fourth modified example of the onboard device 10 according to the present exemplary embodiment. Explanation has been given in the first modified example to the third modified example of cases in which information external to the vehicle is acquired as an event. In the fourth modified example, the present invention is applied to a case in which information related to the body of the driver is acquired as an event. Explanation follows in the fourth modified example of a case in which information related to the tiredness of a driver is acquired as an event as an example of information related to the body of the driver. Configuration that is the same as that of the above exemplary embodiment and modified examples is allocated the same reference numerals, and explanation thereof is omitted.

The difference between the fourth modified example and the first modified example to the third modified example is that, instead of externally acquired information being acquired as an event as in the first modified example to the third modified example, information related to the tiredness of the driver is acquired in the fourth modified example.

Figure 13:
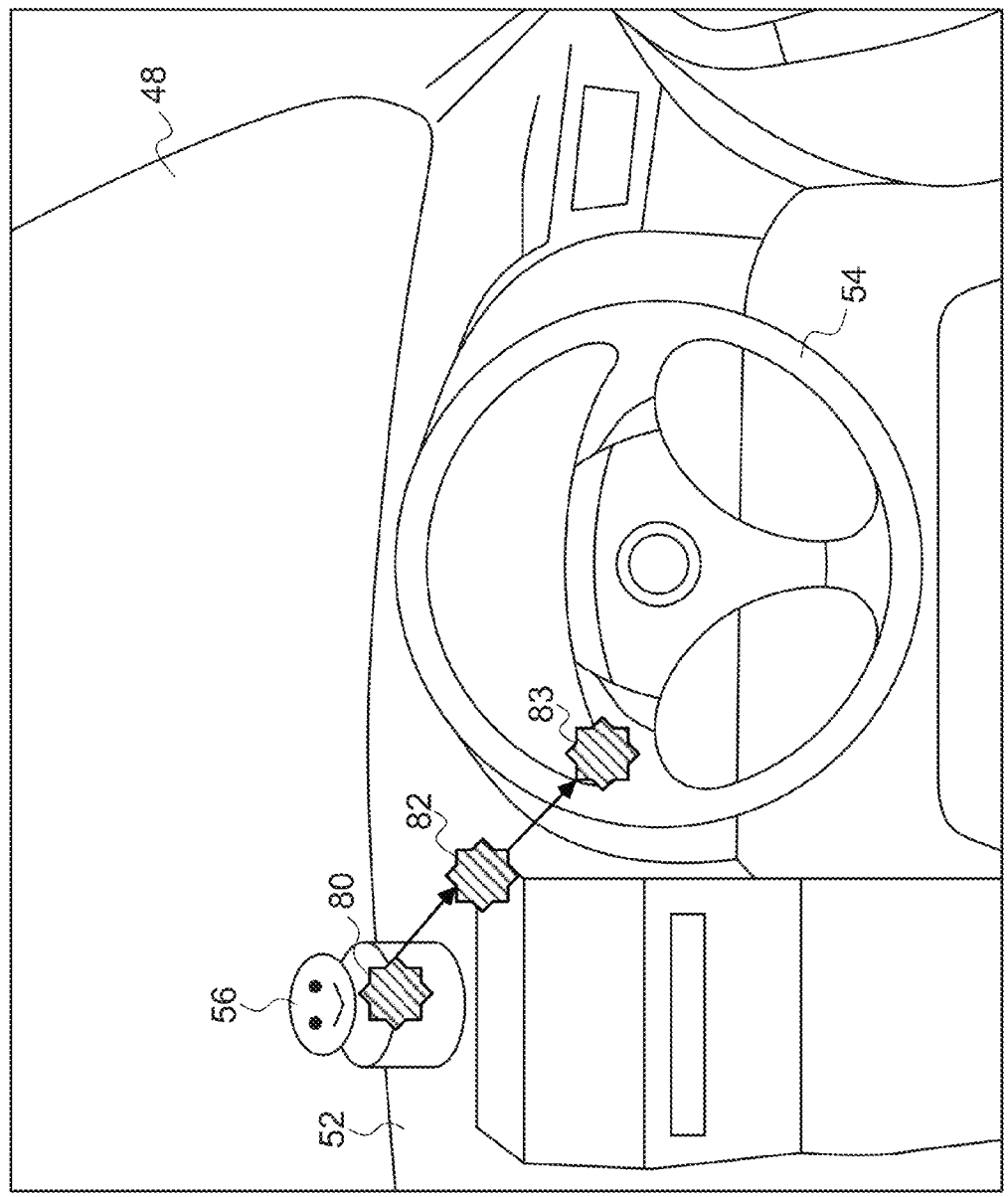
FIG. 13 is an illustrative diagram illustrating an example of movement of assistance information presented in front of a vehicle, according to a fourth modified example.

FIG. 13 is an illustrative diagram to explain an example of movement of assistance information presented in front of a vehicle according to the fourth modified example.

The presentation controller 22 first detects the degree of tiredness of the driver, and acquires information related to the tiredness of the driver according to the detected degree of tiredness as an event (processing of step 102 illustrated in FIG. 5). The degree of tiredness of the driver may, for example, be computed from the duration of continuous driving of the driver. More specifically, a tired state may be determined when the duration of continuous driving of the driver has exceeded a predetermined threshold value. Moreover, the degree of tiredness of the driver may be determined from an image captured by the onboard camera 18. For example, a tired state may be determined when swaying of the posture of the driver exceeds a predetermined threshold value, and wakeful state may be determined when swaying is the threshold value or lower. Namely, the presentation controller 22 may acquire information related to the tiredness of the driver that indicates that the driver is in a tired state, as an event. The presentation controller 22 then presents assistance information of the tired state to the driver (steps 106 to 112), and notifies the driver of the content of the event (information promoting wakefulness of the driver) (step 114).

In the fourth modified example, in the vehicle, the information related to the tiredness of the driver is acquired as an event, and so the content of the event (information to promote wakefulness of the driver) is notified to the driver from the vehicle side. Thus as illustrated in FIG. 13, the position of the mascot 56 provided on the vehicle instrument panel 52 is set as the start point to present the assistance information (step 108 in FIG. 5), and the marker 80 is displayed on the mascot 56. Then, a marker 82 is displayed by the light emitting device 47, and in sequence a marker 83, a marker 84 in the vicinity of an arm region of the driver, and a marker 85 in the vicinity of a shoulder region of a driver, are projected by the projector 46. Then information to promote wakefulness of the driver is notified to the driver by the speaker 44 as content of an event.

Examples of information to promote wakefulness of the driver include audio information such as "Why not take a break?", and information indicating locations for a break, such as parking areas, laybys, and service areas in the vicinity of the vehicle. In cases in which the driver is in a wakeful state, enlivening information promoting further wakefulness of the driver may be presented.

The fourth modified example is thereby able to provide information to the driver during vehicle travel related to the physical state of the driver, namely information corresponding to a wakeful state or to a tired state.

Second Exemplary Embodiment

Explanation next follows regarding a second exemplary embodiment. The second exemplary embodiment is configured similarly to the first exemplary embodiment, and the first modified example to the fourth modified example, and so the same reference numerals are appended to the same configuration, and explanation is omitted thereof.

In the present exemplary embodiment, the present invention is applied to cases in which information exchanged between the vehicle and the driver is an event in which the presentation direction is from the driver toward the vehicle.

Figure 14:
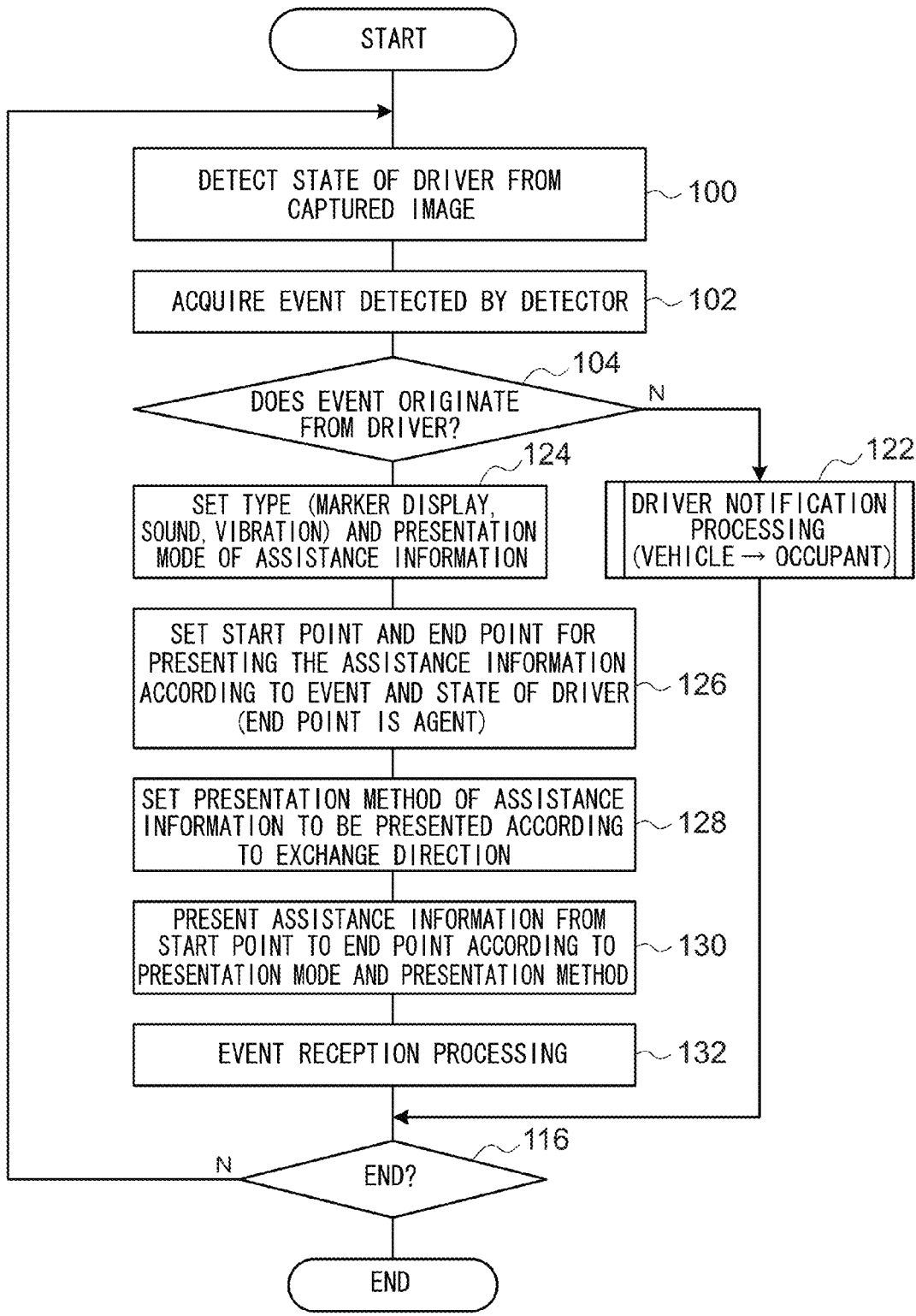
FIG. 14 is a flowchart illustrating an example of a flow of processing executed by a control device according to a second exemplary embodiment.

Explanation next follows regarding operation of the present exemplary embodiment, regarding information presentation control processing executed in the presentation controller 22 (the control device 20) when, for example, the ignition switch of the vehicle installed with the onboard device 10 is switched ON, with reference to the flowchart illustrated in FIG. 14. Explanation follows in the present exemplary embodiment of cases in which, when a request is made by the driver to the vehicle, information representing the request is acquired as an event, and is provided as assistance information.

At step 100 of the information presentation control processing illustrated in FIG. 14, similarly to in the processing of step 100 of FIG. 5, the presentation controller 22 of the control device 20 acquires an image of the driver of the vehicle (an occupant capturing image) from the onboard camera 18, and detects the state of the driver from the acquired occupant capturing image. Then, at step 102, the presentation controller 22 acquires information representing an event from the driver as detected by the microphone 15 serving as the detector 13. Namely, the presentation controller 22 acquires a request issued by the driver using the microphone 15, recognizes the information representing the request, and acquires the information as an event.

Then at step 120, the presentation controller 22 determines whether or not the direction of information presentation is from the driver toward the vehicle by determining whether or not an event is a request from the driver. The determination at step 120 may be determination by discriminating the content of the event, or discriminating whether or not the event was acquired by input to a microphone serving as the detector 13. In the present exemplary embodiment, an event originating from the driver is discriminated by picking up speech from the driver using the microphone 15, and determining that the information presentation direction is the direction from the driver toward the vehicle.

The presentation controller 22 transitions to the processing of step 122 when negative determination is made at step 120. The processing at step 122 is similar to the processing of step 104 to step 114 illustrated in FIG. 5, and so explanation thereof is omitted.

When affirmative determination is made at step 120 by the presentation controller 22, at step 124, similarly to at step 106 of FIG. 5, the type of assistance information and the presentation mode is set. Namely, the assistance information set here is information that expresses the steps up to presenting (notifying) the content of the event from the driver to the vehicle in cases in which information is exchanged from the driver toward the vehicle.

At the next step 126, the presentation controller 22 sets the start point and the end point to present the assistance information along the presentation direction from the driver toward the vehicle based on the content of the event and the state of the driver. The start point of the assistance information is the driver and, for example, a position in the vicinity of the heart of the driver is determined as the start point. The request of the driver is issued to the vehicle, and so the end point of the assistance information is set as the position of the mascot 56 that is installed on the instrument panel 52 as the agent of the vehicle (exchange target) and acts as a locus with respect to information exchange between the vehicle and the driver.

At the next step 128, the presentation controller 22 sets the presentation method to present the assistance information along the presentation direction from the driver toward the vehicle. The presentation method of the assistance information is set as the opposite direction to that set by the processing of step 110 illustrated in FIG. 5. Namely, the presentation direction is from the driver toward the vehicle, and indicates the pattern of movement of the assistance information.

At the next step 130, the presentation controller 22 presents the assistance information of the type and presentation mode set at step 124, from the start point to the end point set at step 126, according to the presentation method (pattern of movement) set at step 128. At the next step 132, processing is executed to make it clear that the vehicle has received the event from the driver, and processing then transitions to step 116. Examples of processing that makes it clear that the vehicle has received the event from the driver include notification of audio information indicating reception, such as "Command received" or "Roger that".

Figure 15:
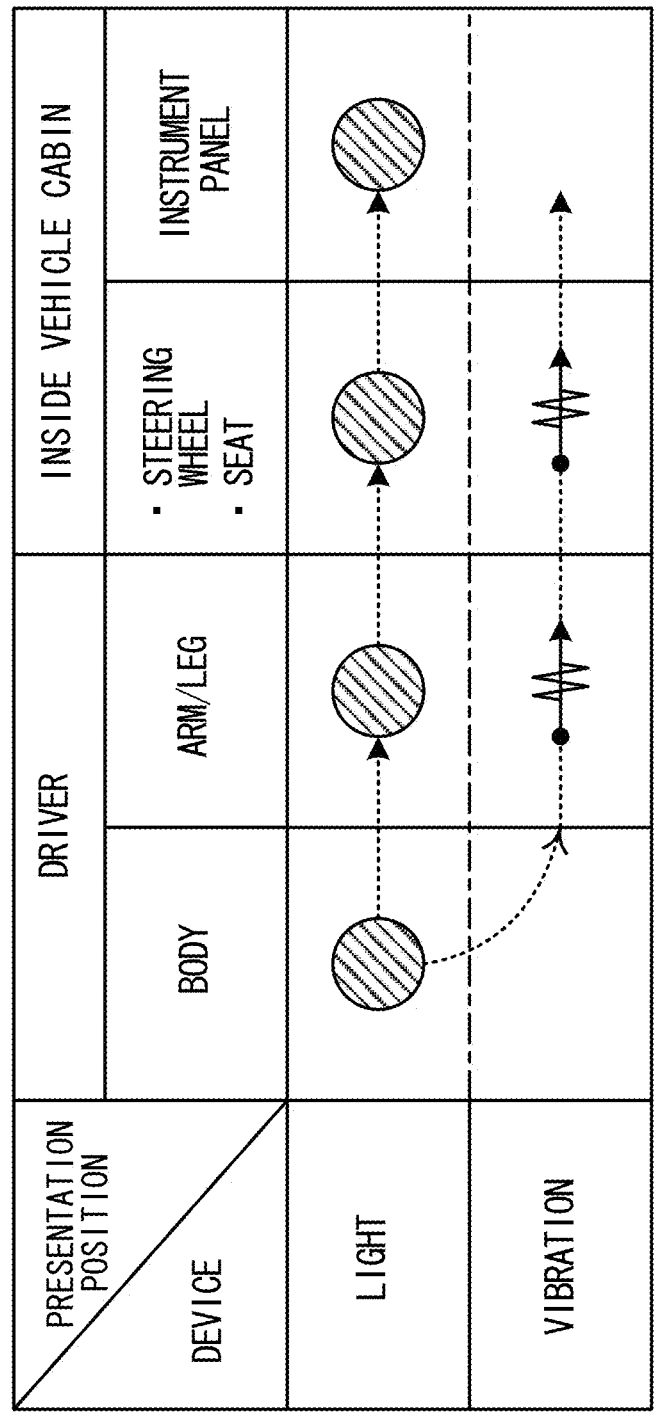
FIG. 15 is an illustrative diagram illustrating an example of relationships between types of assistance information and presentation position.
Figure 16:
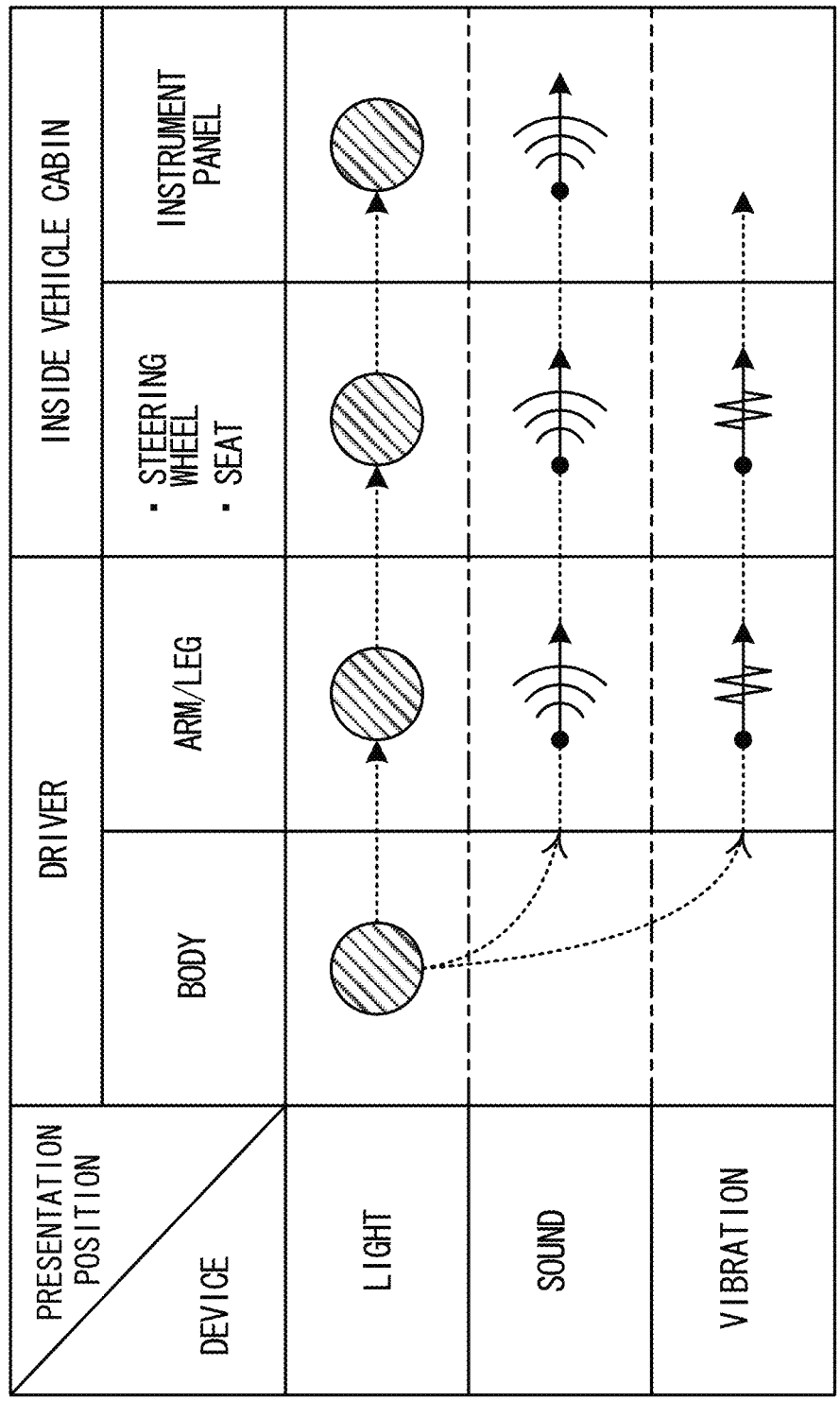
FIG. 16 is an illustrative diagram illustrating an example of relationships between types of assistance information and presentation position.

FIG. 15 and FIG. 16 illustrate an example of a relationship between type and presentation position of assistance information presented when the information presentation control processing is executed. FIG. 17 is an illustrative diagram to explain an example of assistance information presented by the driver in response to an event.

For example, when an event has occurred of the driver making a request to the vehicle, as illustrated in FIG. 16, assistance information is provided to the driver by light and vibration. As illustrated in FIG. 16, assistance information may be additionally provided to the driver by sound. More specifically, as illustrated in FIG. 17, information representing the request from the driver is input by the microphone 15, as an event, assistance information is presented in the direction from the driver toward the vehicle front (the mascot 56), and receipt of the event is notified.

In presentation of the assistance information using light, first a marker 90 is displayed by the projector 46 with a start point of the assistance information at a position in the vicinity of the heart of the driver. Then, in sequence, a marker 91 is projected in the vicinity of a shoulder region of the driver, a marker 92 is projected in the vicinity of an arm region of the driver, and a marker 93 is projected in the vicinity of the steering wheel 54. Then assistance information is displayed in the vehicle cabin using light, namely a marker 94 is displayed by the light emitting device 47 provided on the instrument panel 52. A marker 95 is also displayed on the mascot 56 provided on the instrument panel 52.

Namely, as assistance information using light, markers are projected in sequence from a position in the vicinity of the heart of the driver to the position of the mascot 56. Audio information is then notified to indicate the vehicle has received the event from the driver.

Similarly to in the above exemplary embodiment, in combination with presentation of the assistance information by light, assistance information by sound or vibration may be presented to the driver so as to raise awareness of the assistance information.

As explained above, in the present exemplary embodiment, when a request is made by the driver, after display has been made in sequence of the markers 90 to 95 from the driver toward the mascot 56 at the vehicle front, information indicating that the request from the driver has been received is notified to the driver. This assistance information enables a state (steps) to be expressed as if requests are gradually being given by the driver to the vehicle, enabling affinity to be built between the vehicle and the driver. This thereby enables the intentions of the driver to be presented so that the driver can become aware by the moving markers.

Explanation has been given in the present exemplary embodiment of processing performed by executing a program represented by the flow of processing illustrated in FIG. 5, however processing of the program may be implemented by hardware.

Fifth Modified Example

Explanation next follows regarding a modified example of the onboard device 10 according to the present exemplary embodiment as a fifth modified example. In the present exemplary embodiment, explanation has been given of a case in which information indicating a request issued by the driver is acquired as an event. In the fifth modified example, the present invention is applied to cases in which information related to the body of the driver is detected at the vehicle side, and the detected information related to the body of the driver is an event. Similar configuration to that of the above exemplary embodiment is allocated the same reference numerals, and explanation thereof is omitted.

The difference between the fifth modified example and the second exemplary embodiment is that instead of taking the information representing a request from the driver as the event in the second exemplary embodiment, information related to the body of the driver is detected in the fifth modified example, and the detected information is taken as an event.

The presentation controller 22 detects the state of the driver, and acquires information representing the detected state of the driver as an event (processing of step 102 illustrated in FIG. 4). The state of the driver may, for example, be a computed temperature distribution of the body of the driver, or a pulse of the driver, by using the onboard camera 18. Specifically, an anxious state of the driver can be discriminated as occurring when the temperature distribution of the body of the upper body of the driver has exceeded a predetermined threshold value, or when the pulse of the driver has exceeded a predetermined threshold value. When an anxious state of the driver is discriminated, the presentation controller 22 sets the presentation mode of assistance information representing that the driver is in an anxious state (step 124), and then presents the assistance information (step 130).

This thereby enables the driver to become aware that the vehicle is trying to ascertain the state of the body of the driver himself/herself, enabling affinity to be built between the vehicle and the driver.

In the present modified example, explanation has been given of a case in which an anxious state of the driver is detected as an example of information related to the body of the driver detected by the vehicle side, however, there is no limitation thereto. For example, when the driver is active and in a wakeful state, assistance information may be presented by a presentation mode that indicates the driver is lively. This thereby enables the driver to become aware that the vehicle is trying to ascertain the lively state of the driver, enabling affinity to be built between the vehicle and the driver.

In the above exemplary embodiments and modified examples, explanation has been given of cases in which the present invention is applied to situations in which driver is steering the vehicle, however, there is no limitation to presentation of information while the vehicle is being steered by the driver. For example, during automatic driving by an automatic steering system that performs automatic steering control processing to automatically drive a vehicle, assistance information and content of an event may be presented by the onboard device 10 according to the detected state of the vehicle or the detected state of the driver.

In the above exemplary embodiments and modified examples, explanation has been respectively given of cases in which the presentation direction of information is from the vehicle toward the driver, or the presentation direction of information is from the driver toward the vehicle, however, combinations may be made of the exemplary embodiments and the modified examples.

In the above exemplary embodiments and modified examples, explanation has been given regarding a driver as an example of an occupant, however, the present invention is applicable to any occupant riding in a vehicle.

In the above exemplary embodiments and modified examples, explanation has been given of cases in which a picture is displayed at a single location, however, for example, display may be performed at plural locations.

The processing performed by the control device 20 in the above exemplary embodiments and modified examples may be stored as a program on a storage medium or the like, so as to be distributed.

EXPLANATION OF THE REFERENCE NUMERALS

10 onboard device (vehicle information presentation device)
12 event detection section (detection section)
13 detector
14 communication unit
15 microphone
16 occupant state detection section
18 onboard camera
20 control device (control section)
22 presentation controller
24 presentation section (presentation section)
26 device (presentation section)
43 display
44 speaker
45A actuator
45B actuator
45C actuator
46 projector
47 light emitting device
56 mascot

What is claimed is:

1. A vehicle information presentation device comprising:
a presentation section that is configured to project information perceivable by an occupant at each of a plurality of positions on surfaces of a plurality of distinct objects within a vehicle cabin along a presentation direction for presenting particular information to be exchanged between a vehicle and the occupant;

a detection section that detects the presentation direction for presenting the particular information; and a control section that controls the presentation section so as to move the perceivable information in sequence to a plurality of positions, beginning with a start point and ending with an end point, along the presentation direction detected by the detection section, the start point corresponding to a position of a target for presentation determined by the particular information, and the end point corresponding to a position at a terminal end of the presentation direction detected by the detection section, wherein:

the detection section includes a monitoring section that monitors a position on part of the body of the occupant; and the presentation section presents the perceivable information at a plurality of positions on a part of the body of the occupant based on a monitoring result of the monitoring section.

2. The vehicle information presentation device of claim 1, wherein:

the plurality of positions are provided at at least one out of a picture display section capable of displaying a picture superimposed on actual scenery in front of the vehicle, or part of the body of the occupant.

3. The vehicle information presentation device of claim 2, wherein:

in cases in which the presentation direction is from one side at the left or right of the vehicle and from one out of the vehicle or the occupant toward the other out of the vehicle or the occupant, the control section controls the presentation section so as to sequentially move through each of the plurality of positions from the side of the picture display section corresponding toward the one side at the left or right of the vehicle to the side of the picture display section corresponding to the other side at the left or right of the vehicle, and so as to sequentially move through each of the plurality of positions on the side of part of the body of the occupant corresponding to the one side at the left or right of the vehicle.

4. The vehicle information presentation device of claim 1, wherein:

the presentation section presents the perceivable information through at least one out of a light emitting section that shines light onto the occupant, a sound generation section that imparts sound to the occupant, or a vibration section that imparts vibration to the occupant.

5. The vehicle information presentation device of claim 4, wherein:

the presentation section includes, as the light emitting section, a picture display section capable of displaying a picture superimposed on actual scenery in front of a vehicle, and a marker display section that displays a marker of a specific color and specific shape within the vehicle cabin; and the control section sequentially displays a picture of the marker as the perceivable information on the picture display section, and displays the marker as the perceivable information using the marker display section.

6. The vehicle information presentation device of claim 1, wherein:

the control section controls using a direction toward the occupant as the presentation section in cases in which the detection section has detected the direction from the vehicle toward the occupant for presenting the particular information that is required to draw the attention of the occupant.

7. The vehicle information presentation device of claim 1, wherein:

the control section controls the presentation section with a direction from the occupant toward a predetermined position within the vehicle cabin as the presentation direction in cases in which the detection section has detected a direction from the occupant toward the vehicle for presenting the particular information that originates from the occupant.

* * * * *